United States Patent [19]

Salzman

[11] 4,204,695
[45] May 27, 1980

[54] SHOPPING CART CHILD SEAT

[76] Inventor: Marilyn F. Salzman, 355 Dungate Dr., Chesterfield, Mo. 63017

[21] Appl. No.: 927,219

[22] Filed: Jul. 24, 1978

Related U.S. Application Data

[63] Continuation-in-part of Ser. No. 752,065, Dec. 20, 1976, Pat. No. 4,108,489.

[51] Int. Cl.² ............................................. A47D 1/10
[52] U.S. Cl. .............................. 280/33.99 B; 297/250
[58] Field of Search ................. 280/33.99 R, 33.99 A, 280/33.99 B, 47.35; 297/37, 250

[56] References Cited

U.S. PATENT DOCUMENTS

| 2,615,726 | 10/1952 | Brottman | 280/33.99 B |
| 3,350,136 | 10/1967 | Allen | 280/33.99 B X |
| 4,065,142 | 12/1977 | Rehrig | 280/33.99 B |

Primary Examiner—Richard A. Bertsch
Assistant Examiner—Michael Mar
Attorney, Agent, or Firm—Richard J. Sher

[57] ABSTRACT

A collapsible shopping cart child seat is utilized in conjunction with conventional shopping cart seat structures in order to help restrain small children from climbing in the cart and to help prevent the child from falling laterally to either side, thus providing a safer seat structure. The child seat of the invention may be fully collapsed and carried in a woman's purse to the supermarket. The seat may then be unfolded and easily secured together to form a seat having side restraining flaps. A single strap both attaches the seat within the cart and acts as a child-restraining safety belt. The seat according to the invention is extremely simple and economical in construction while providing superior durability.

10 Claims, 6 Drawing Figures

U.S. Patent  May 27, 1980  4,204,695
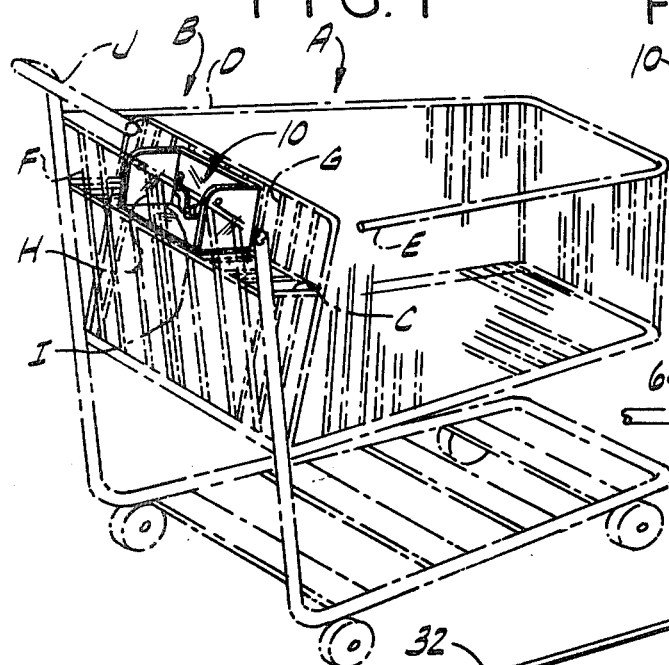
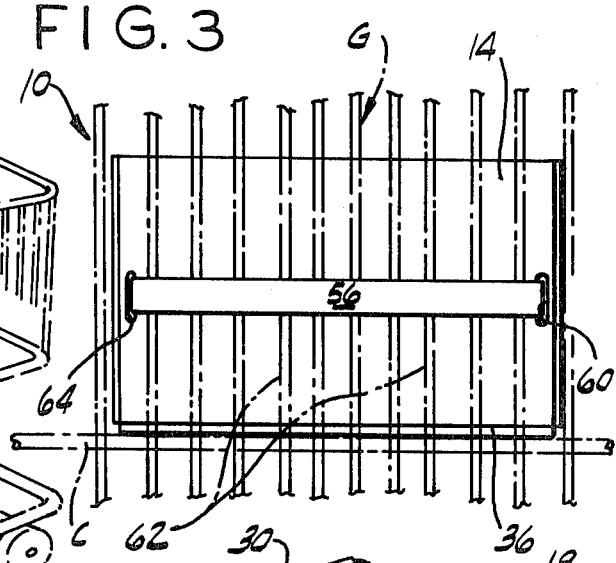
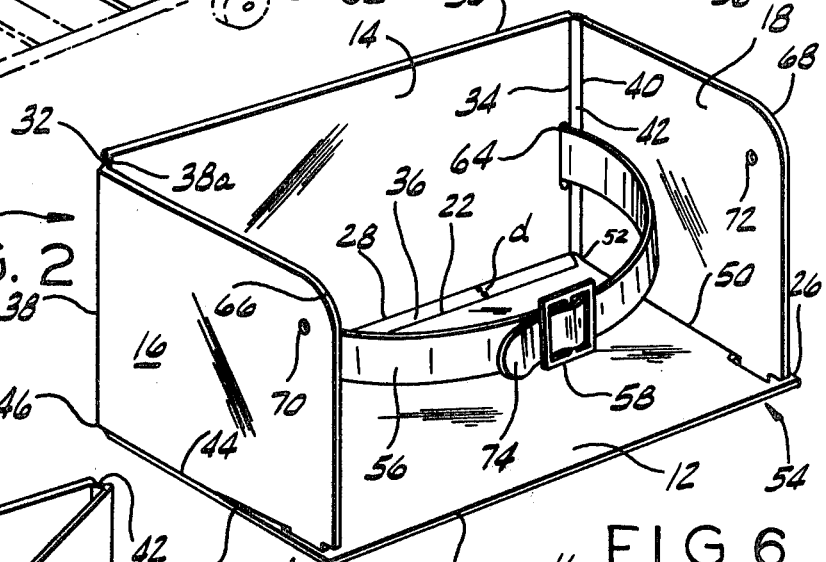
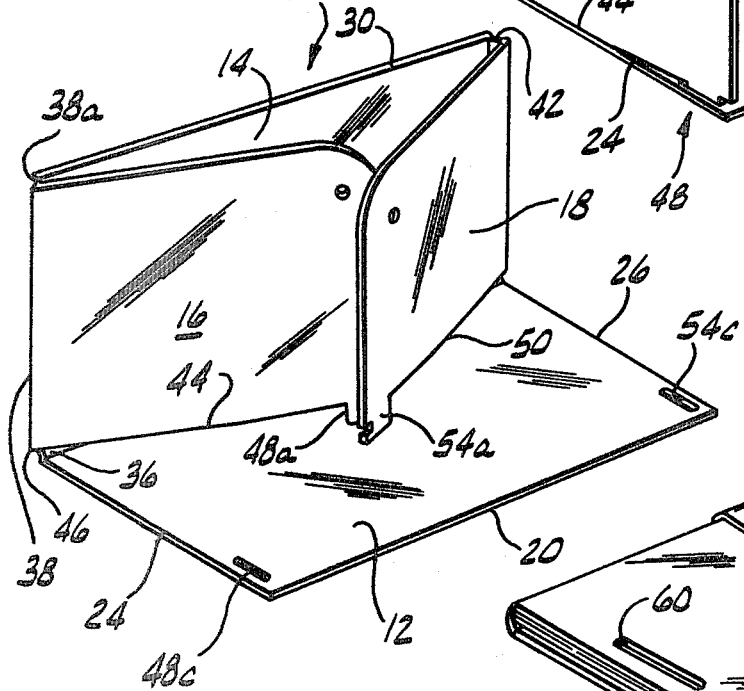
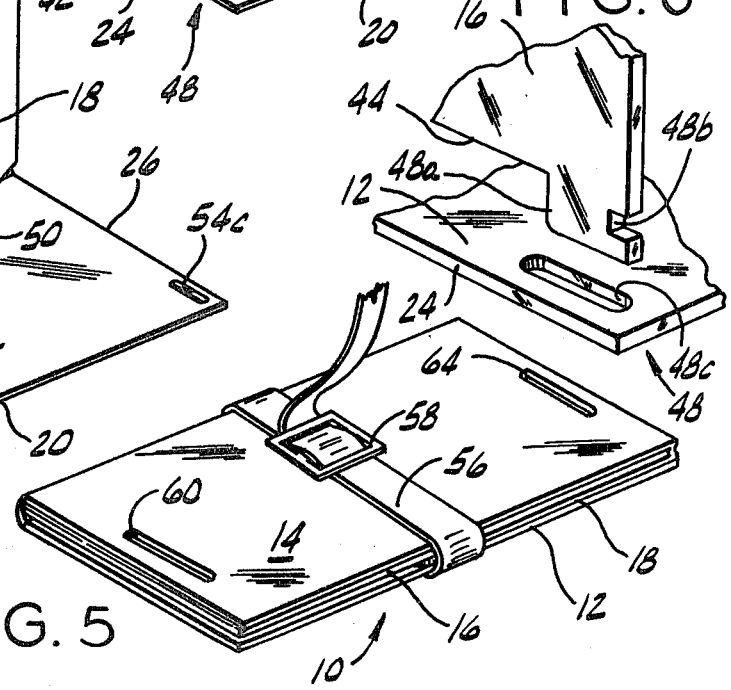

SHOPPING CART CHILD SEAT

BACKGROUND AND SUMMARY OF THE INVENTION

This is a continuation-in-part of copending application Ser. No. 752,065, filed Dec. 20, 1976, now U.S. Pat. No. 4,108,489.

The invention relates to improvements in child seats utilized in conjunction with shopping carts. The vast majority of modern shopping carts provided for customers of self-service supermarkets and the like are fabricated of heavy gauge wire and tubular stock material. These carts include a child seat structure having a substantially horizontal platform and rearwardly facing seat back. A child may be positioned in the cart facing the operator with the child's legs extending through openings provided therefor in the rear wall of the cart.

The child seat structures described hereinabove have proven to be deficient in transporting very small children or infants. Infants for example, do not possess the strength necessary to independently remain seated in an upright position. It is commonplace for an infant to fall or slump laterally when positioned upright in a shopping cart child seat, thus rendering the child seat useless and even dangerous.

Another problem encountered in the use of child seat structures provided in conventional shopping carts is that older children placed therein often try to extricate themselves therefrom and thereby create the possibility of accident such as falling out of the cart.

The present invention remedies the above mentioned problems inherent in a conventional shopping cart child seat, by providing an economical, simple and durable child seat structure embodying means for preventing a child placed therein from falling laterally to either side and means for restraining the child from extricating himself from the seat.

The preferred embodiment of the invention provides a portable seat sized to fit into conventional shopping cart child seat structures. A simple strap is provided for securing the seat to the cart and for holding the child within the seat, and side restraining flaps are included to prevent the child from falling to either side. In use, the seat is affixed to the cart; however, it can easily be removed from from the cart, collapsed and secured in the collapsed position so that it may be carried home in a shopping bag or in a woman's purse.

It is therefore an object of the invention to provide improved child seats for use with shopping carts and the like which prevent a small child or infant from falling laterally to either side when placed in the shopping cart seat.

It is another object of the instant invention to provide means for restraining a child from extricating himself from a shopping cart seat.

It is still another object of the invention to provide a portable child seat which is constructed to permit the facile collapse thereof and the securing thereof in such collapsed condition.

These as well as other objects and advantages of the invention will become more apparent upon a reading of the hereinbelow detailed description of the preferred embodiment of the instant invention in conjunction with the drawings wherein:

FIG. 1 is a perspective view of the invention as utilized in a conventional shopping cart;

FIG. 2 is an enlarged perspective view of the novel child seat per se;

FIG. 3 is a rear elevational view of the child seat in a shopping cart;

FIG. 4 is a perspective view of the child seat partially collapsed;

FIG. 5 is a perspective view of the child seat fully collapsed; and

FIG. 6 is an enlarged perspective view of a portion of the child seat showing the tab-slot securing structure.

DETAILED DESCRIPTION OF THE PREFERRED EMBODIMENT

With reference to the drawings and FIG. 1 in particular, there is shown a portable child seat 10 depicted as it would be used in a conventional child seat structure of a conventional shopping cart A. It is noted that a portion of the shopping cart A has been cut away to more clearly show the position of child seat 10 therein.

Shopping cart A is of any conventional design having a child seat structure B which includes a substantially horizontal platform C constructed of parallel, spaced, heavy-gauge wire. As shown, platform C extends along the entire width of shopping cart A, that is, from side D to side E. Child seat structure B of cart A also includes a rear wall F and a forward wall G, each also formed of parallel, spaced wire. Rear wall F is provided with two openings therein H and I for accomodating the legs of a child placed in child seat structure B, which child would be facing the operator pushing cart A by means of cart handle J (only partially shown). It is believed that this brief description of shopping cart A is sufficient to establish a foundation for describing the child seat 10 of the instant invention, and since the shopping cart per se forms no part of the invention, no further details of the cart structure are deemed necessary.

With reference to FIGS. 2-4, child seat 10 is shown having a seat panel 12, a back panel 14, and two side restraining flaps 16 and 18. Panels 12 and 14 and flaps 16 and 18 may be fabricated of any sturdy and durable material such as plastic, and preferably the entire seat 10 is fabricated of a single integral piece of plastic and a single strap as will be described hereinbelow. Seat panel 12 includes two parallel side edges 20 and 22 and two parallel end edges 24 and 26. Back panel 14 likewise includes two parallel side edges 28 and 30 and two parallel end edges 32 and 34. Side edge 22 of seat panel 12 is coextensive with side edge 28 of back panel 14 and is hinged thereto as by means of a flexible, integral hinge portion 36 which is of a width d approximately twice the thickness of each side restraining flap 16 and 18. Upwardly extending edge 38 of side flap 16 is coextensive with and integrally hinged along hinge line 38a to end edge 32 of back panel 14, and upwardly extending edge 40 of side flap 18 is coextensive with and hinged to end edge 34 of back panel 14 along integral hinge portion 42 which is of a width slightly greater than the thickness of side flap 16.

Side flap 16 includes a lower, horizontally disposed edge 44 adjoining edge 38 at corner 46 and edge 44 as shown is in substantially coextensive relationship with end edge 24 of seat panel 12 where it is secured in position by tab-slot securing means 48. Side flap 18 includes a lower, horizontally disposed edge 50 adjoining edge 40 at corner 52 and edge 50 as shown is in substantially coextensive relationship with end edge 26 of seat panel 12 where it is secured in position by tab-slot securing means 54.

Securing means 48, as best seen in FIG. 6, includes a tab portion 48a depending downwardly from horizontal edge 44 of flap 16 near the free end thereof. Tab portion 48a includes a forwardly opening indentation 48b having a vertical dimension slightly greater than the thickness of seat panel 12. Securing means 48 also includes an elongated slot 48c in seat panel 12 located directly below tab portion 48a. When a hand force is applied on flap 16 to produce a slight arcing of edge 44, tab 48a may be inserted downwardly within slot 48c. After tab 48a is within slot 48c, flap 16 is allowed to regain the normal planar shape thereof and indentation 48b moves slightly forward to captively retain and secure flap 16 in an open position with edge 44 thereof substantially coextensive with edge 24 of seat panel 12. Securing means 54 includes tab portion 54a and slot 54c and acts to secure flap 18 in an open position as shown in FIG. 2 in an identical manner as described hereinabove with respect to securing means 48.

An elongated seat belt or strap 56 preferably of plastic material includes a buckle 58 on one end thereof and passes first through a vertical slot 60 (FIG. 3) in back panel 14 located adjacent edge 32 thereof and when in place in shopping cart A, strap 56 is threaded around a few of the vertical wires 62 forming a part of forward wall G of child seat structure B of cart A. Thereafter strap 56 is passed through vertical slot 64 in panel 14 adjacent edge 34 and into secure, adjustable engagement with buckle 58.

It is noted that side restraining flaps 16 and 18 have rounded corners 66 and 68 diagonally opposite respective corners 46 and 52 to further reduce the possibility of injury to a child placed in seat 10. Further, adjacent corners 66, 68 there are provided holes 70 and 72 for the purpose of facilitating the connection of a child's toy to seat 10 in a convenient position for entertaining a child. The diameter of holes 70, 72 is less than ¼ inch to prevent an infant from lodging a finger therein.

Since the child seat 10 is sized to fit into a conventional shopping cart seat structure, the dimensions of the seat 10 when collapsed as shown in FIG. 5 will be approximately 10½"×7"×¾", thus it may be conveniently carried in a woman's purse.

It can thus be appreciated that a child seat for use with shopping carts according to the principles of the invention will prevent a small child or infant placed therein from falling laterally to either side and will restrain the child from extricating himself from the seat, thereby alleviating the possibility of injury to the child and rendering greater piece of mind and freedom to the parent while shopping. As shown hereinabove, a child seat possessing these advantages can be conveniently carried to the supermarket and placed into a conventional shopping cart.

Inasmuch as numerous modifications may be made to the construction of the present invention without departing from the spirit and scope thereof, for example, the side flaps 16, 18 may be hinged to the panel 12 instead of the back panel 14 and releaseably connected to back panel 14; and any commonly known securing means such as snaps, buttons, etc., can be substituted for the disclosed tab-slot securing means, it is, therefore, requested that the scope of the invention be determined solely by the claims appended hereto.

I claim:

1. In combination, a shopping cart having a child seat structure including a horizontal platform extending along the entire width of said cart between two vertical side walls of said cart; and
    a child seat fitted within said child seat structure, said child seat comprising:
    a first panel having first and second side edges and first and second end edges;
    a second panel having third and fourth side edges and third and fourth end edges;
    said first panel having said second side edge thereof coextensive with and hinged to said third side edge of said second panel;
    said first, second, third and fourth side edges being shorter than the length of said platform;
    first and second restraining flaps, each having a first edge coextensive with and hinged to a respective one of said first and second end edges of said first panel, each of said restraining flaps having a second edge adjoining a respective one of said first edges of said flaps and movable into coextensive relationship with a respective one of said third and fourth end edges of said second panel; and
    securing means for releaseably securing each of said second edges of said restraining flaps in said coextensive relationship;
    wherein, when said second edges of said restraining flaps are in said coextensive relationship, said restraining flaps are spaced from said side walls of said cart to thereby prevent a child placed within said child seat from falling laterally against said side walls of said cart.

2. The improved child seat as specified in claim 1 and further characterized by:
    said first edges of said restraining flaps being hinged to a respective one of said first and second end edges of said first panel by means of integrally-formed, flexible hinge portions;
    said first panel being hinged to said second panel by another integrally-formed, flexible hinge portion;
    said another hinge portion having a width approximately equal to twice the thickness of each of said restraining flaps; and
    one of said first-mentioned hinge portions having a width approximately equal to the thickness of each of said flaps.

3. The improved child seat as specified in claim 1 and further characterized by:
    said first panel being a back panel and said second panel being a seat panel;
    an adjustable seat belt extending through a first slot in said back panel adjacent said first restraining flap, and extending around at least part of such shopping cart and thence through a second slot in said back panel adjacent said second restraining flap, thereby releaseably connecting said back panel to such shopping cart.

4. The improved child seat as specified in claim 3 and further characterized by:
    said restraining flaps and said seat panel being foldable along said hinge portions onto said back panel into a collapsed position; and
    said seat belt being removable from said first and second slots and positionable around said seat in said collapsed position.

5. The improved child seat as specified in claim 1 and further characterized by:
    said securing means include an integral tab portion extending downwardly from each of said restraining flaps;

an elongated slot in said seat panel situated adjacent each of said tab portions; and an indentation in the forward edge of each of said tab portions;

wherein a slight force tending to arc said restraining flaps allows the entrance of said tab portions into a respective slot and the release of such force positions a portion of said seat panel in said indentation to thereby secure said seat in an open position.

6. A collapsible child seat for use with a shopping cart comprising:

a first panel having first and second side edges and first and second end edges;

a second panel having third and fourth side edges and third and fourth end edges;

said first panel having said second side edge thereof coextensive with and hinged to said third side edge of said second panel;

first and second restraining flaps, each having a first edge coextensive with and hinged to a respective one of said first and second end edges of said first panel, each of said restraining flaps having a second edge adjoining a respective one of said first edges of said flaps and movable into coextensive relationship with a respective one of said third and fourth end edges of said second panel;

securing means for releaseably securing each of said second edges of said restraining flaps in said coextensive relationship;

said first edges of said restraining flaps being hinged to a respective one of said first and second end edges of said first panel by means of integrally-formed, flexible hinge portions;

said first panel being hinged to said second panel by another integrally-formed, flexible hinge portion; and a single strap associated with one of said panels acting as both a means of attaching the seat to a shopping cart and as a means of holding a child within said seat.

7. The child seat as specified in claim 6 and further characterized by:

said another hinge portion having a width approximately equal to twice the thickness of each of said restraining flaps; and one of said first-mentioned hinge portions having a width approximately equal to the thickness of each of said flaps.

8. The child seat as specified in claim 6 and further characterized by:

said first panel being a back panel and said second panel being a seat panel;

said single strap extending through a first slot in said back panel adjacent said first restraining flap, and thence through a second slot in said back panel adjacent said second restraining flap.

9. The child seat as specified in claim 8 and further characterized by:

said restraining flaps and said seat panel being foldable along said hinge portions onto said back panel into a collapsed position; and said strap being romoveable from said first and second slots and positionable around said seat in said collapsed position.

10. The child seat as specified in claim 8 and further characterized by:

said securing means include an integral tab portion extending downwardly from each of said restraining flaps;

an elongated slot in said seat panel situated adjacent each of said tab portions; and an indentation in the forward edge of each of said tab portions;

wherein a slight force tending to arc said restraining flaps allows the entrance of said tab portions into a respective slot and the release of such force positions a portion of said seat panel in said indentiation to thereby secure said seat in an open position.

* * * * *